United States Patent [19]

Carroll et al.

[11] 4,358,841

[45] Nov. 9, 1982

[54] VIDEO DISC PLAYER HAVING STYLUS PROTECTING APPARATUS

[75] Inventors: Charles B. Carroll, Trenton, N.J.; Alfred L. Baker, Zionsville, Ind.

[73] Assignee: RCA Corporation, New York, N.Y.

[21] Appl. No.: 252,569

[22] Filed: Apr. 9, 1981

[51] Int. Cl.³ ............................ G11B 3/58; G11B 3/10
[52] U.S. Cl. ...................................... 369/77; 369/170; 369/256
[58] Field of Search ................. 369/77, 230, 170, 172, 369/256

[56] References Cited

U.S. PATENT DOCUMENTS 3,952,147 4/1976 Leedom .............................. 369/172
4,049,280 9/1977 Leedom .............................. 369/256
4,256,311 3/1981 Allen et al. ......................... 369/170
4,285,524 8/1981 Hughes et al. ....................... 369/77

Primary Examiner—Steven L. Stephan
Attorney, Agent, or Firm—E. M. Whitacre; J. S. Tripoli; D. A. Kulkarni

[57] ABSTRACT

The video disc player includes a selectively-actuated stylus arm lifter. When the player is in the PLAY mode, a forward bias is applied to the lifter electromagnet to cause it to lower the stylus on the record. When the player is disposed in the record LOAD/UNLOAD mode, the lifter is reverse biased to prevent the stylus from being lowered and coming in contact with moving parts during the record load/unload operations.

5 Claims, 19 Drawing Figures

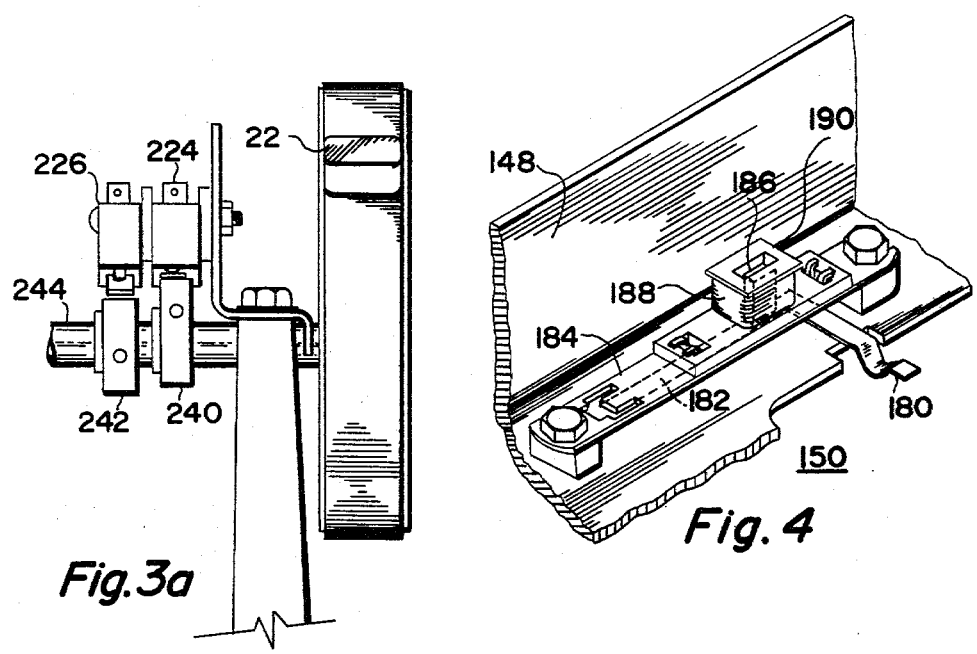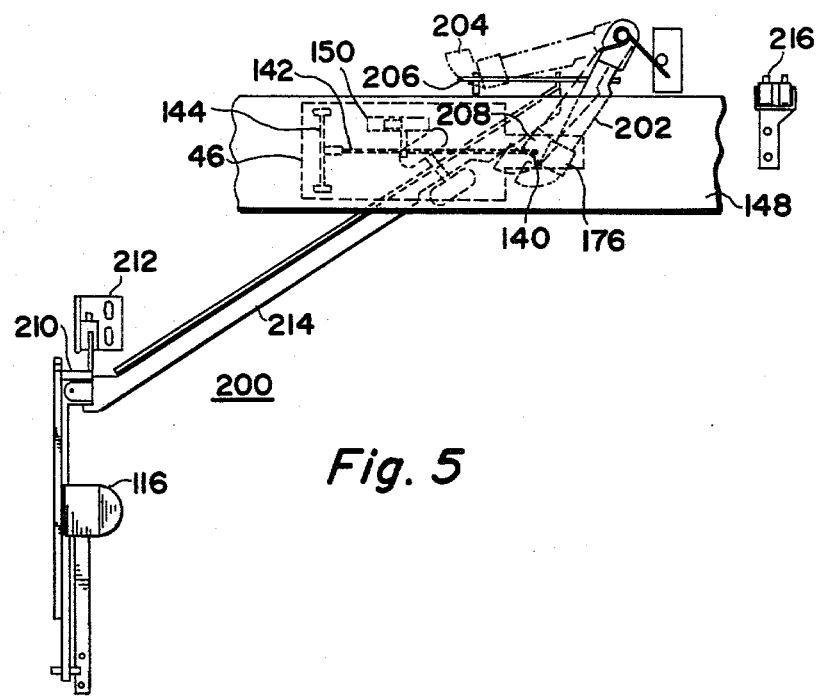

VIDEO DISC PLAYER HAVING STYLUS PROTECTING APPARATUS

This invention generally relates to a video disc player, and more particularly, it concerns a caddy-type video disc player.

In certain systems, picture and sound signals are stored on a disc record in the form of physical undulations in a continuous spiral track disposed on the record surface. The variations in electrical capacitance between an electrode defined by a record-engaging stylus and a conductive property of the record are sensed as the physical undulations on the record surface pass beneath the stylus tip. The capacitive variations are converted into electrical signals suitable for application to a conventional television receiver. A capacitance-type pickup system is illustratively disclosed in U.S. Pat. No. 3,842,194 (Clemens).

Typically, a video disc record is housed in a protective caddy which comprises an outer jacket and a record retaining spine. The spine is provided with an opening in which a record is received, thereby forming a record/spine assembly. For record loading, a full caddy is manually inserted into the player along a pair of guide rails provided in the player. A record extraction mechanism disposed in the player removes the record/spine assembly from the jacket for retention in the player on a set of receiving pads during subsequent jacket withdrawal. To transfer the record to the turntable for playback, the turntable is raised relative to the receiving pads. The player is provided with hold-down members which hold the spine in place while allowing the record to be picked up by the turntable when it is raised. During playback, the pickup stylus is traversed radially across the record while the turntable revolves the record at the desired speed (e.g., 450 rpm). For record retrieval, the record is transferred back to the receiving pads by lowering the turntable with respect to the receiving pads to redefine the record/spine assembly. An empty jacket is then reinserted into the player, whereby the record/spine assembly is retrieved into the jacket.

The pickup stylus is, typically, disposed at one end of a stylus arm having the other end secured to a protective cartridge by means of a flexible coupler. The flexible coupler allows the stylus to follow the vertical and horizontal movements of the record surface (e.g., warp, eccentricity, etc.). The cartridge is mounted in a carriage having an opening in the bottom wall thereof through which the pickup stylus protrudes, when lowered, for record engagement. The carriage is fitted with a selectively-operated stylus arm lifter. Typically, the lifter is spring biased upward. The lifter further includes a device, which when activated, overcomes the spring force in order to lower the stylus arm support. During playback, the carriage is translated from a starting position at the back of the player toward the record center so as to follow the radially inward motion of the stylus.

In such systems, it is advantageous to reset the carriage to the starting position during the insertion of a caddy into the player. As an empty caddy is inserted into the player for record retrieval, the front edge thereof engages the carriage to drive it back to a preset limit stop defining the starting position.

One type of failure occurs if the stylus comes down as the carriage hits the limit stop at the end of its backward travel. Since the caddy is moving under the carriage at this time, it could damage the stylus if contact is made. The situation is aggravated by driving the caddy forcefully into the player. The caddy, in turn, drives the carriage rapidly against the limit stop, thereby generating a shock pulse. The vertical component of the shock pulse could overcome the spring bias of the lifter to allow the stylus to come down in the path of moving parts.

To function properly, the upward spring bias of the lifter must be light, since the spring bias must be overcome rapidly in response to the energization of the device to set the stylus down on the record. This makes the lifter quite susceptible to lowering the stylus due to any small vertical forces, such as those developed when the carriage strikes the limit stop at the end of its rearward travel.

The stylus protecting apparatus, in accordance with the subject invention, includes means for applying a reverse polarity signal to the selectively-energized device, when stylus lowering is not desired, to generate an upward force on the stylus arm support in tandem with the upward force exerted thereon by the biasing spring.

In the drawings:

FIG. 3a shows details of a pair of function lever-actuated switches of the subject stylus protecting apparatus;

FIG. 4 illustrates a stylus arm lifter suitable for use with the present stylus protecting apparatus;

FIG. 5 depicts the details of a stylus cleaner mechanism incorporated in the player of FIGS. 1 and 3.

Figure 1:
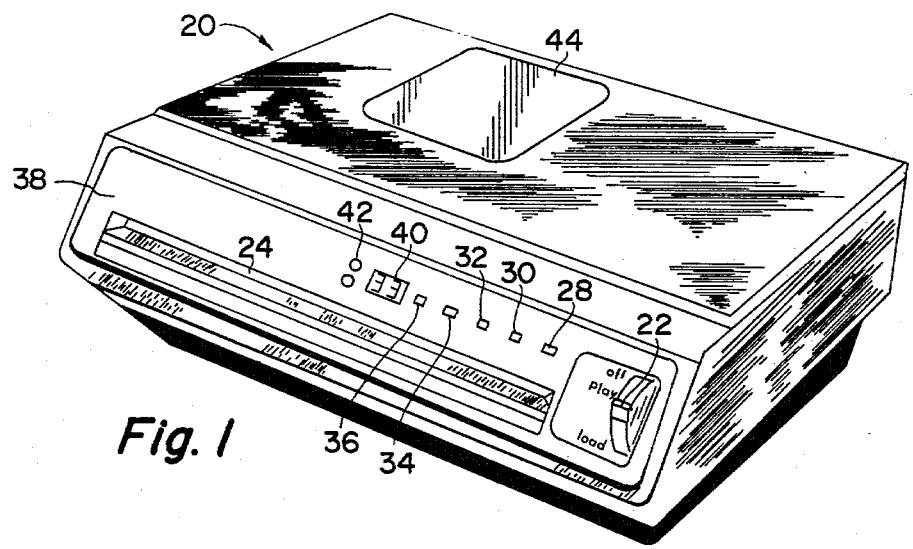
FIG. 1 is a video disc player incorporating a stylus protecting apparatus in accordance with the instant invention.

Shown in FIG. 1 is a video disc player 20 incorporating the present stylus protecting apparatus. A function lever 22 on the front side of the player is subject to disposition in any one of three positions—OFF, PLAY and LOAD/UNLOAD. A caddy entry door closes a caddy input slot 24 when the function lever 22 is disposed in the OFF and PLAY positions. In the LOAD/UNLOAD position of the function lever 22, the caddy entry door is opened to permit insertion of a full video disc caddy 26, shown in FIG. 2, into the player to load an enclosed record therein. A pushbutton 28 is provided to dispose the player in the "PAUSE" mode to allow the viewer to interrupt the program for as long as desired without missing any of the program content. In the PAUSE mode, the pickup device is raised and its lateral motion is arrested. A set of pushbuttons 30, 32, 34 and 36 are arranged on the instrument panel 38 to dispose the player in any one of four "SEARCH" modes, i.e., rapid access (forward/reverse) and visual search (foward/reverse), to permit the viewer to quickly locate a precise section of the prerecorded program. During rapid access, the pickup device is lifted, and rapidly moved sideways. In visual search, the pickup device is rapidly moved sideways while in engagement with the record. A digital LED readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A removable door 44 is disposed on the cover of the player to provide access to a stylus cartridge 46, shown in FIG. 3, so that it can be changed when required.

Figure 2:
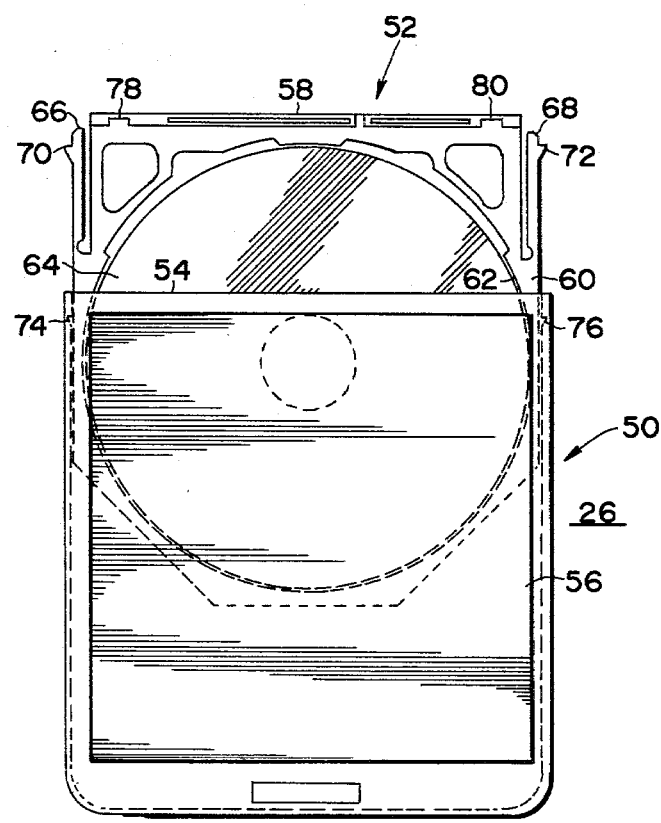
FIG. 2 shows a video disc caddy suitable for use with the player of FIG. 1.

As shown in FIG. 2, the video disc caddy 26 comprises a jacket 50 and a record retaining spine 52. The jacket 50 has an edge opening 54 in communication with a cavity 56 for enclosing a record/spine assembly. The spine 52 has a portion 58 which serves as a closure, and a further portion 60 having a circular opening 62 for receiving a centrally-apertured record 64. The spine 52 is further fitted with integrally-molded, flexural latch fingers 66 and 68. Each of the spine latch fingers 66 and 68 has a protruding element 70 and 72. The protruding elements 70 and 72 are received in pockets 74 and 76 disposed in the jacket 50 for capturing the spine 52 when it is fully seated therein. The spine 52 is provided with cutouts 78 and 80 for selectively receiving a pair of spine gripper members mounted in the player to secure the spine thereto in the manner explained later.

Figure 3:
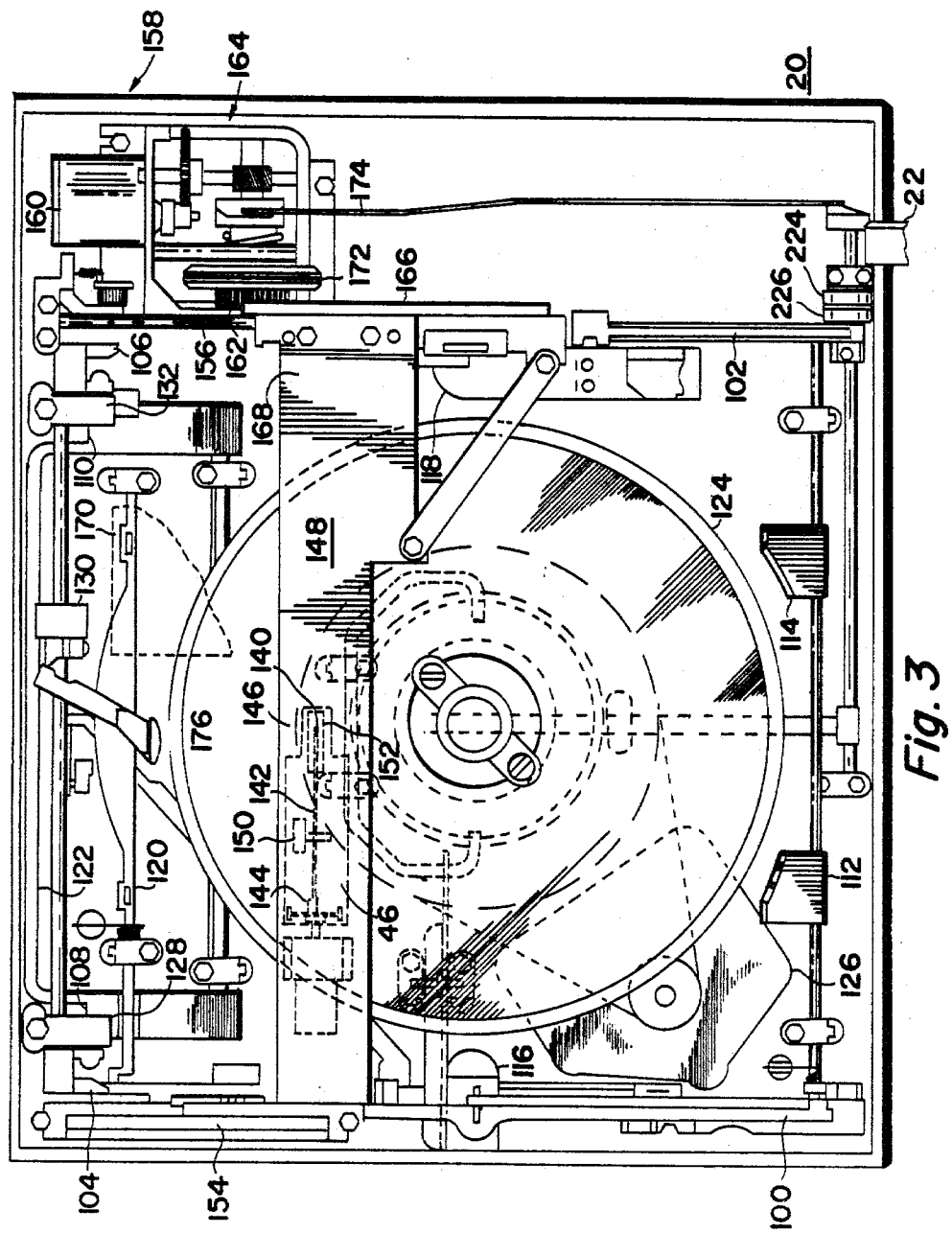
FIG. 3 represents a plan view of the player of FIG. 1 with its cover removed to show the underlying details.

The operation of a record loading/unloading mechanism provided in the player will first be explained in conjunction with FIG. 3. To insert a record, a loaded caddy 26 is guided into the input slot 24 along a path defined by side rails 100 and 102. As the caddy arrives at a fully inserted position in the player, latch defeat members 104 and 106 enter the jacket 50 to defeat the spine latch fingers 66 and 68, thereby freeing the spine 52 from the jacket. Pivotally mounted in the player are spine gripper members 108 and 110 which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 104 and 106 and is latched to the player through the operation of the spine gripper members 108 and 110, subsequent withdrawal of the jacket leaves the record/spine assembly in the player. The retained record/spine assembly is supported on a set of depressible receiving pads 112, 114, 116, 118 and 120. A pair of springs (not shown) disposed between a gripper arm 122, which carries the spine gripper members 108 and 110, and the latch defeat members 104 and 106 effect downward deflection of the latch defeat members upon jacket withdrawal.

To transfer the retained record to a turntable 124, the function lever 22 is displaced to the PLAY position, which, in turn, raises the turntable and starts a turntable motor 126. A set of hold-down members 128, 130 and 132 hold the retained spine 52 in place against the receiving pads 112, 114, 116, 118 and 120 while permitting the retained record to be intercepted by the turntable 124 when it is raised. The hold-down members 128, 130 and 132 also serve to accurately locate the retained spine 52, longitudinally and laterally, in the player.

A pickup stylus 140 is disposed at one end of a stylus arm 142, the other end of which is suspended in the cartridge 46 by means of a flexible rubber coupler 144. The cartridge 46 is placed in a compartment 146 provided in a stylus arm carriage 148, and the carriage lid, not shown, is closed.

A stylus arm lifter 150 is mounted in the carriage 148 to selectively lower the pickup stylus 140 through an opening 152 provided in the bottom wall of the carriage to effect record engagement. The details of the lifter 150 will be explained later in conjunction with FIG. 4. During playback, the carriage 148 is translated on guide ways 154 and 156 disposed parallel to the caddy side rails 100 and 102 from a starting position at the back of the player toward the front of the player in synchronism with the radially inward motion of the pickup stylus 140. The carriage drive mechanism 158 comprises a servo-controlled motor 160 which drives a pinion 162 through a gear train 164. The pinion 162 engages a rack 166 secured to the underside of the carriage 148 to translate the carriage along the guide ways 154 and 156 in such a way as to keep the pickup stylus 140 centered in the cartridge 46.

During playback, the variations in electrical capacitance between an electrode carried by the stylus 140 and a conductive property of the record 64, in correspondence to the rises and falls of the disc surface under the stylus end, are sensed by pickup circuitry 168 to reproduce the stored information on the record. The recovered signals are processed by signal processing circuits 170 to reconstruct a television signal containing picture and a sound information for application to a television receiver.

To transfer the record back to the receiving pads 112, 114, 116, 118 and 120 after playback, the function lever 22 is depressed to the LOAD/UNLOAD position, which, in turn, lowers the turntable 124 to a level below the receiving pads. When the turntable 124 is lowered, the record is deposited on the receiving pads 112, 114, 116, 118 and 120 for reception in the opening 62 disposed in the spine 52 to redefine the record/spine assembly. The turntable motor 126 is shut off when the function lever 22 is displaced to the LOAD/UNLOAD position. The location of the receiving pads 112, 114, 116, 118 and 120, occupying the raised position thereof, is such that the record/spine assembly is aligned with the center line of the caddy side rails 100 and 102.

To retrieve the record/spine assembly, the empty jacket 50 is inserted into the player through the input slot 24 along the caddy side rails 100 and 102. As the jacket 50 is driven into the player, the front edge thereof engages the carriage 148 to push it back to a preset travel limit stop defining the starting position, and it also engages the already deflected latch defeat members 104 and 106 to cause further downward deflection thereof. Such further downward deflection of the latch defeat members 104 and 106, in turn, effects downward displacement of the spine gripper members 108 and 110, whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

To facilitate restoration of the carriage 148 to its starting position when an empty caddy is inserted into the loaded player for record retrieval, a selectively actuated clutch 172 is interposed between the pinion 162 and the gear train 164 to disconnect the carriage from its drive mechanism 158 during the caddy insertion. The function lever 22 acts upon the clutch 172 through a lever 174 when the player is disposed in the LOAD/UNLOAD mode to free the carriage 148 from any hindrance by the carriage drive mechanism 158.

The stylus arm lifter 150 will now be described in reference to FIG. 4. The lifter 150 is activated to lower the stylus 140 as required for proper player operation. The stylus is lowered during normal play and visual search. Furthermore, the stylus 140 is set down onto a cleaning pad 176 disposed at the back of the player each time the record is extracted from the player in the manner described later. In all other conditions, including power off, the stylus 140 is lifted upward.

The lifter 150 comprises a stylus support arm 180 integrally disposed at one end of a leaf spring 182. The other end of the leaf spring 182 is fixedly attached to a carriage-mounted bracket 184. Disposed on the leaf spring 182, near its free end, is a small permanent magnet 186, which is subject to reception within the winding 188 of an electromagnet 190. When an appropriate polarity pulse is applied to the winding 188 of the electromagnet 190, it generates a repelling force on the magnet 186 which overcomes the upward force exerted by the leaf spring 182 to cause the stylus 140 to come down.

The player is further fitted with a stylus cleaner 200 depicted in FIG. 5. When a loaded caddy is inserted into the player to deposit a record on the turntable 124, its front edge engages a spring-loaded cleaner arm 202, carrying the cleaning pad 176, to drive it back to a retracted position 204. The cleaner arm 202 is held in the retracted position by the record retaining spine 52 when the empty jacket 50 is withdrawn. To retrieve the record/spine assembly, the empty jacket is inserted into the player in the manner hereinbefore indicated. As the loaded caddy is removed from the player, the cleaner arm 202 follows the exit travel of the caddy until its motion is arrested by a latch plate 206 at an intermediate position 208. As the loaded caddy is further removed from the player, it actuates a cam 210 which, in turn, momentarily operates a cleaner switch 212, and it further causes the latch plate 206 to release the cleaner arm 202 through a linkage 214. The cleaner switch 212, in conjunction with a spine sense switch 216, operates the lifter 150 to momentarily lower the stylus 140 onto the cleaning pad 176 as the spring-loaded cleaner arm 202 swings out to cause the cleaning pad to wipe the stylus. The spine sense switch 216 serves to disable the cleaner switch 212 when the spine 52 is present in the player.

As indicated hereinbefore, one type of failure occurs if the stylus 140 comes down as the carriage 148 strikes the limit stop at the end of its travel. If the stylus 140 comes into contact with any moving parts—e.g., caddy, cleaner arm, etc., it could result in stylus damage. The problem is exacerbated by driving the caddy forcefully into the player. The caddy, in turn, drives the carriage 148 rapidly against its stop setting up a shock wave. The vertical component of the shock pulse could overcome the upward force exerted by the leaf spring 182 to lower the stylus 140.

Moreover, for proper operation, the upward force exerted by the lifter spring 182 must be light, so tha the stylus 140 can be rapidly lowered in response to the relatively weak forces developed by the small electromagnet 190. This makes it quite susceptible to lowering the stylus 140 due to any small vertical force, for example, such as the one produced when the carriage 148 hits the stop at the end of its travel.

The subject stylus protecting apparatus 220, represented in FIGS. 6-18, selectively generates an upward force on the stylus arm support 180 in tandem with the upward force of the lifter spring 182 to inhibit any tendency of the stylus 140 to come down inadvertently. When the player is disposd in the LOAD/UNLOAD mode, a circuit means 222 is used to apply a reverse polarity signal to the winding 188 of the electromagnet 190 to produce a further upward force on the lifter arm 180.

The details of the stylus protecting apparatus 220 will now be described. In FIGS. 6-18, the reference numerals 212 and 216, respectively, refer to the aforementioned stylus cleaner switch and the spine sense switch. The player is further fitted with a play switch 224 and a load/unload switch 226 (hereinafter L/U switch), which are responsive to the action of the function lever 22 in the manner illustrated in FIG. 3a. When the function lever 22 is disposed in the PLAY mode and the L/U mode, the play switch 224 and the L/U switch are, respectively, actuated.

Figure 6:
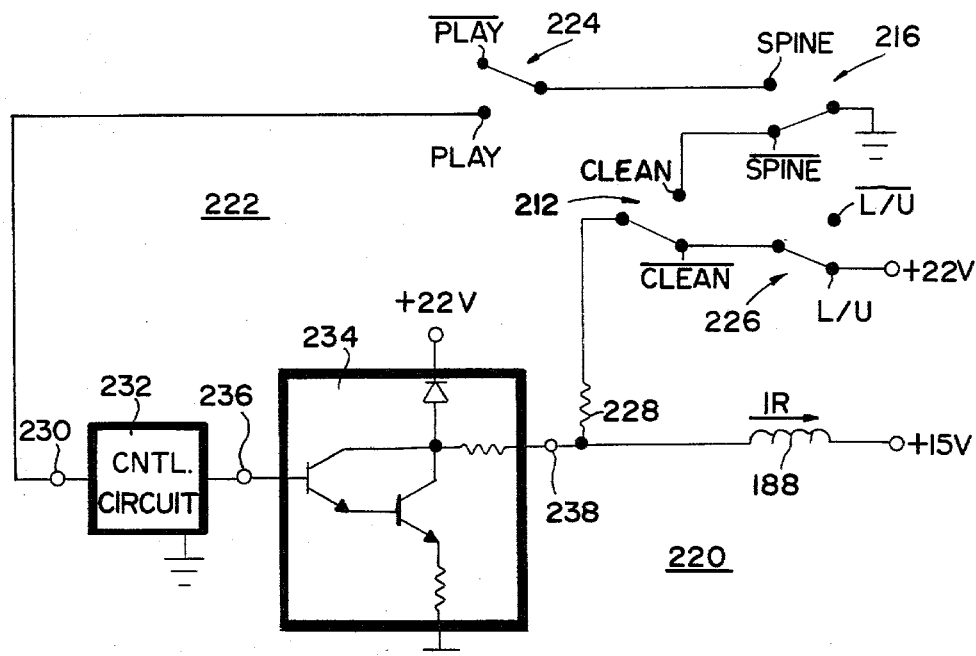
FIGS. 6-18 illustrate the operation of the subject stylus protecting apparatus.

To load a record into the player, the function lever 22 is disposed in the L/U mode. The status of the switches 212, 216, 224 and 226 is as shown in FIG. 6. The +22 volt source causes a current, $I_R$, to flow in the reverse direction through the lifter winding 188 and a current-limiting resistor 228 into the +15 volt supply. The magnitude of the resistance 228 is chosen to allow sufficient reverse current to flow through the lifter winding 188 to provide an effective upward force on the lifter magnet 186, while preventing occurrence of excessive temperature rise in the lifter winding. The reverse current through the lifter winding 188 provides an additional upward force on the stylus arm support 180 to prevent the stylus 140 from coming down.

Figure 7:
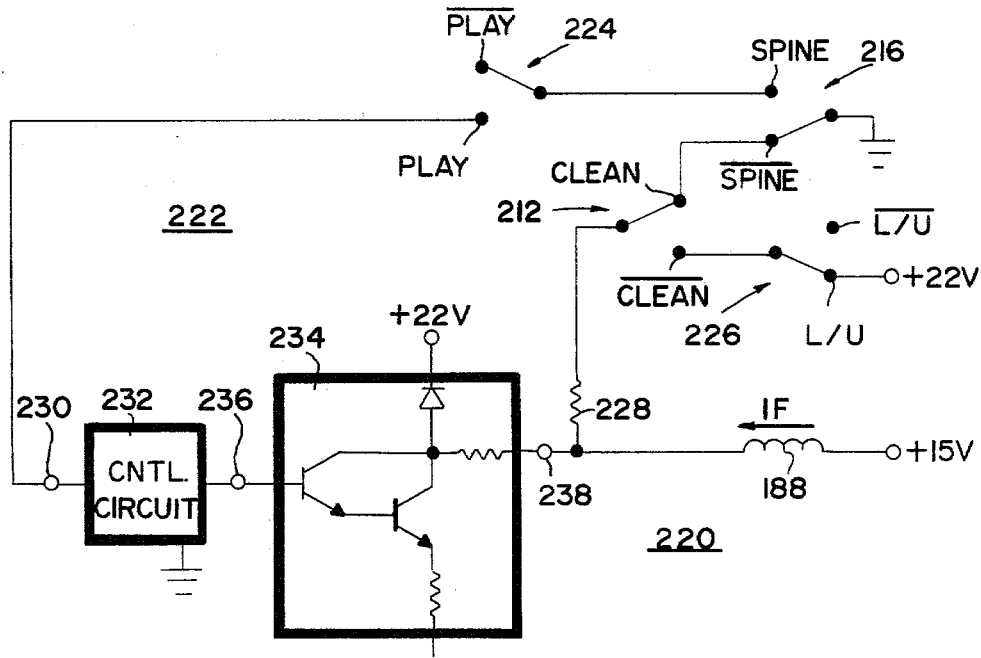

FIG. 7 shows the switch positions when a loaded caddy momentarily actuates the stylus cleaner switch 212 as the caddy is inserted into the player for record loading. The +15 volt supply drives a forward current, $I_F$, to flow through the lifter winding 188 into the ground through the switches 212 and 216. The forward current passing through the lifter winding 188 momentarily lowers the stylus 140.

Figure 8:
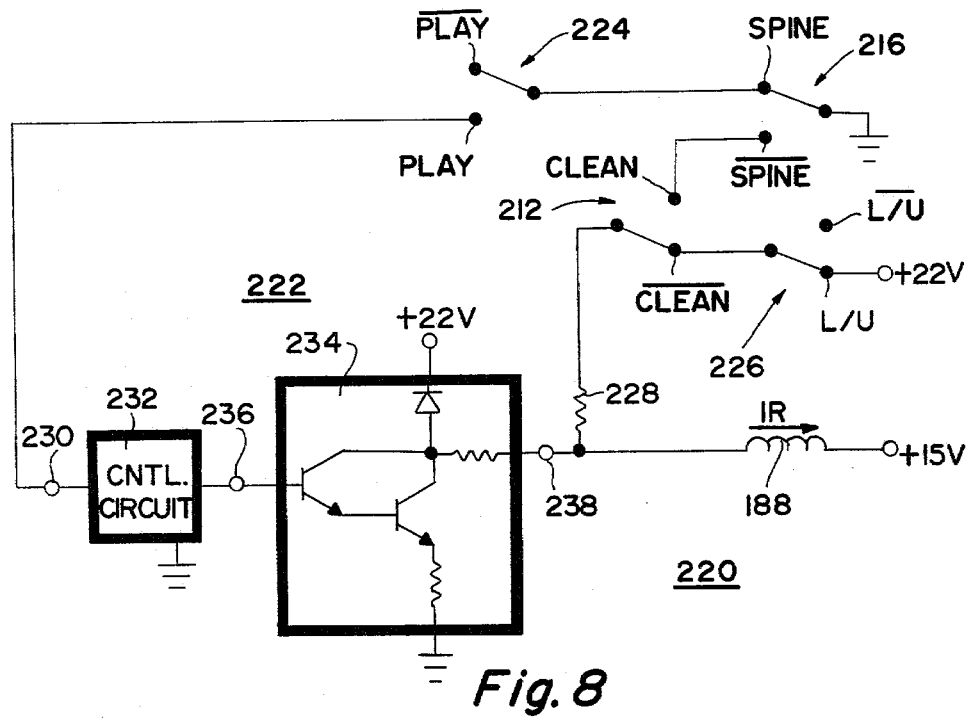

FIG. 8 depicts the condition of the switches when the loaded caddy is fully inserted into the player. The reverse current flowing through the lifter winding 188 biases the stylus arm 142 away from the record.

Figure 9:
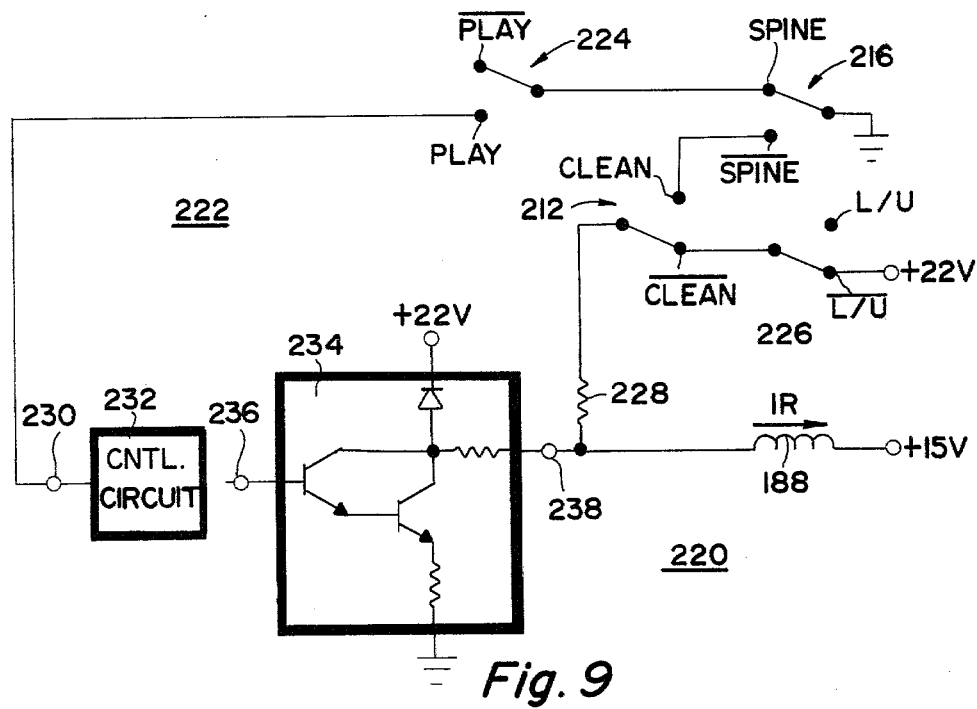

FIG. 9 illustrates the operation of the switches as the empty jacket is extracted from the player leaving the record/spine assembly in the player resting on the receiving pads 112, 114, 116, 118 and 120. The reverse current through the lifter winding 188 urges the stylus 140 away from the record.

Figure 10:
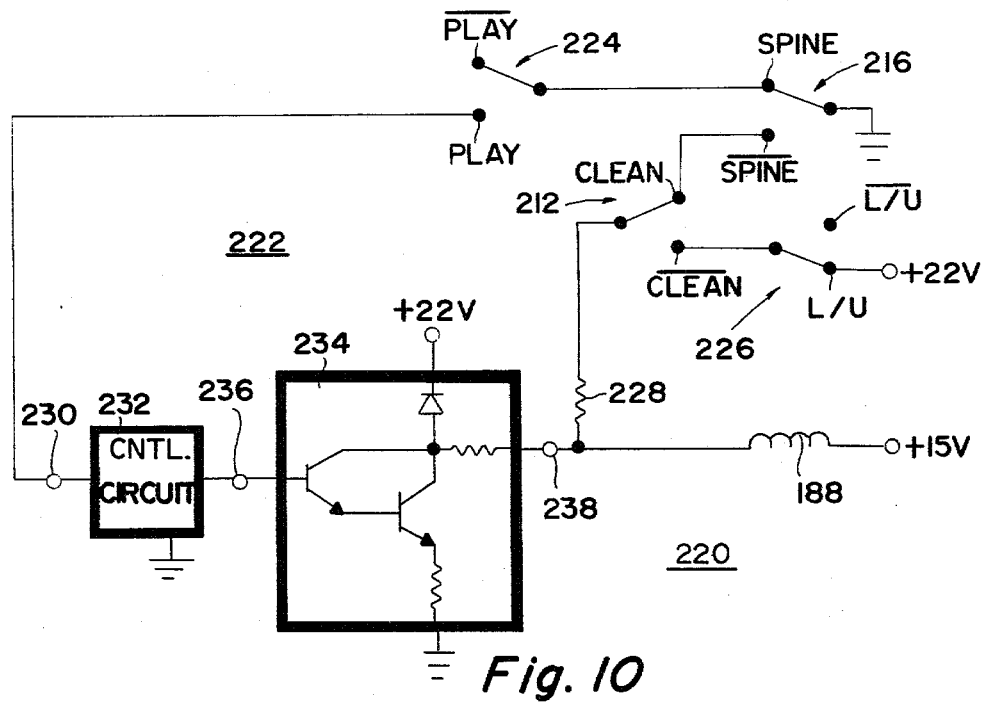

FIG. 10 shows the switch positions when the empty jacket momentarily operates the stylus cleaner switch 212. No current flows through the lifter winding 188 because of the open circuit condition.

Figure 11:
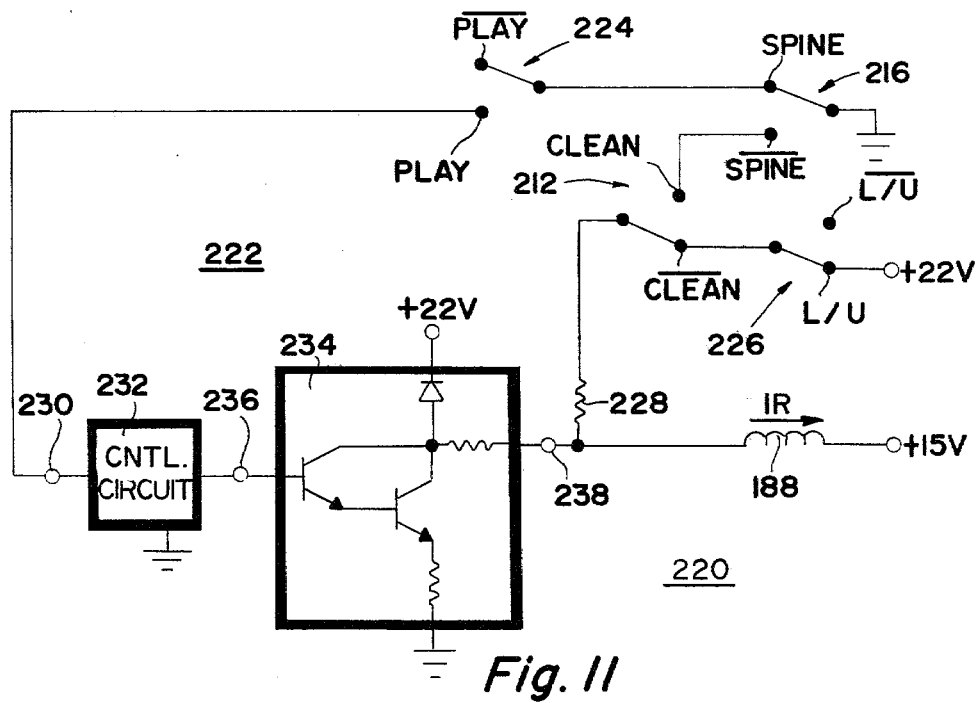

FIG. 11 shows the switch status as the empty jacket is further withdrawn from the player. The reverse current passing through the lifter winding 188 provides an upward bias on the stylus arm support 180.

Figure 12:
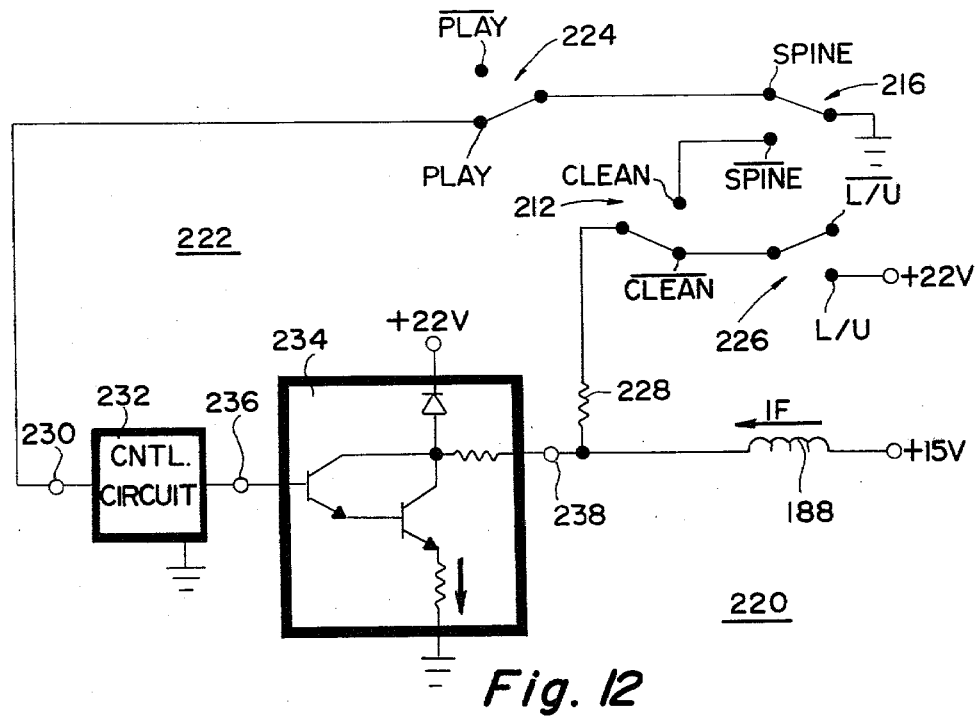

To transfer the retained record to the turntable 124 and to initiate the playback operations, the function lever 22 is shifted into the PLAY location. FIG. 12 shows the corresponding switch positions. When the player is disposed in the PLAY mode, a zero volt ground potential is presented to the input terminal 230 of a control circuit 232 through the spine sense switch 216 and the play switch 224. The application of the ground potential to the input terminal 230 causes the control circuit 232 to turn on a lifter drive circuit 234 coupled to the output terminal 236 of the control circuit. This can be accomplished by a microprocessor which serves several player control functions, one of which is to respond to the play switch 224 to produce a signal at its output terminal 236 which turns on the lifter drive circuit 234. When the lifter drive circuit 234 is activated, a forward current flows from the +15 volt supply through the lifter winding 188 into the terminal 238 of the lifter drive circuit. The passage of the forward current through the electromagnet winding 188, generates forces on the lifter permanent magnet 186 to lower the pickup stylus 140 so that the playback operations can be resumed.

Figure 13:
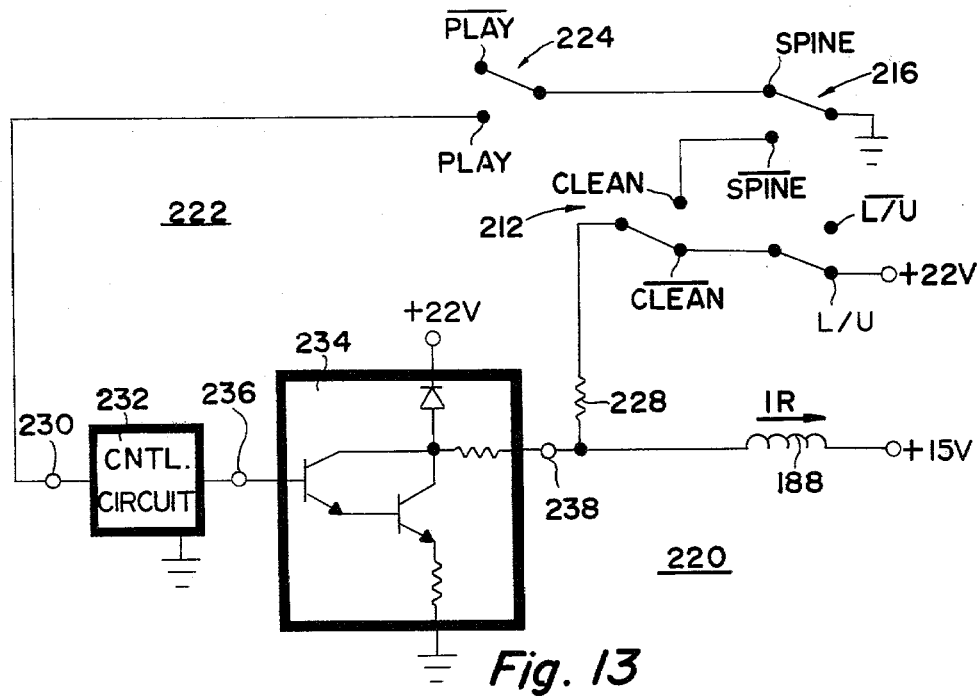

For record retrieval, the turntable 124 is lowered by moving the function lever 22 to the L/U position, whereby the retained record is transferred to the receiving pads 112, 114, 116, 118 and 120. The status of the switches 212, 216, 224 and 226 is as indicated in FIG. 13. The switch-actuating cams 240 and 242, depicted in FIG. 3a, are arranged on the function lever rod 244 such that the play switch 224 is opened before the L/U switch 226 is closed. The switch-actuating cams 240 and 242 are offset to allow a controlled stylus lift off from the record via a decreasing voltage across the lifter winding 188 set by the control circuit 232.

When the function lever 22 reaches the L/U position, the +22 volt source drives a reverse current through the lifter winding 188 into the +15 volt supply. The reverse current passing through the lifter winding 188 biases the stylus arm 142 away from the record.

Figure 14:
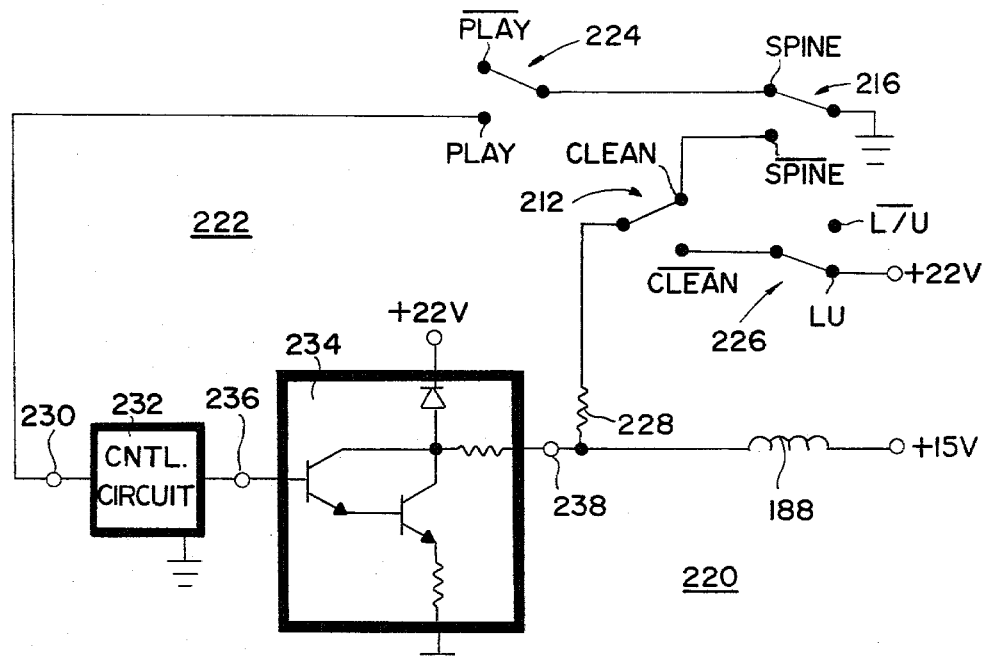

To retrieve the record, an empty jacket is inserted into the player. As the empty jacket is driven into the player, it momentarily actuates the stylus cleaner switch 212. The switch status is shown in FIG. 14. No current flows through the lifter coil 188 for a brief moment as both circuits are open.

Figure 15:
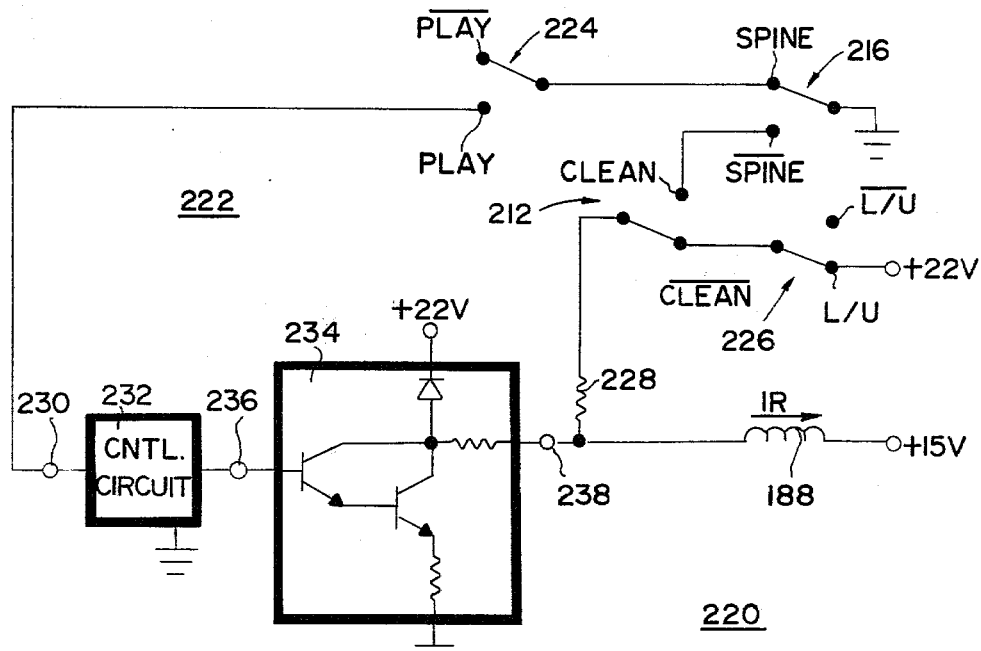

FIG. 15 represents the switch positions when the jacket is completely inserted. The reverse current passing through the lifter winding 188 urges the stylus assembly away from the record.

Figure 16:
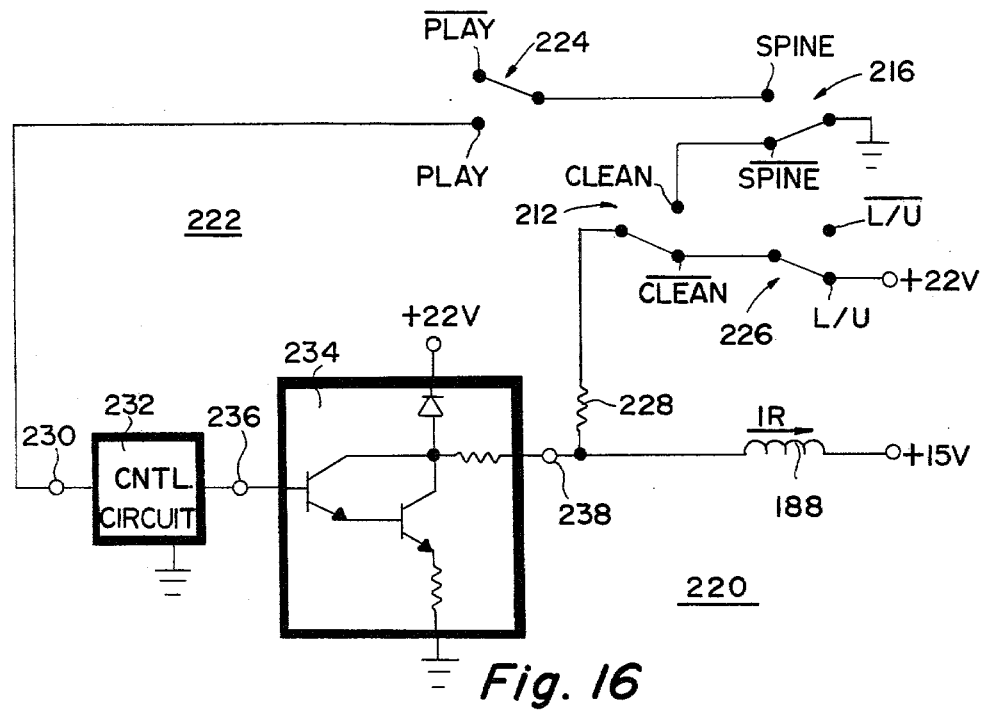

FIG. 16 illustrates the switch condition as the exit travel of the loaded caddy begins. The lifter 150 remains in the reverse bias mode.

Figure 17:
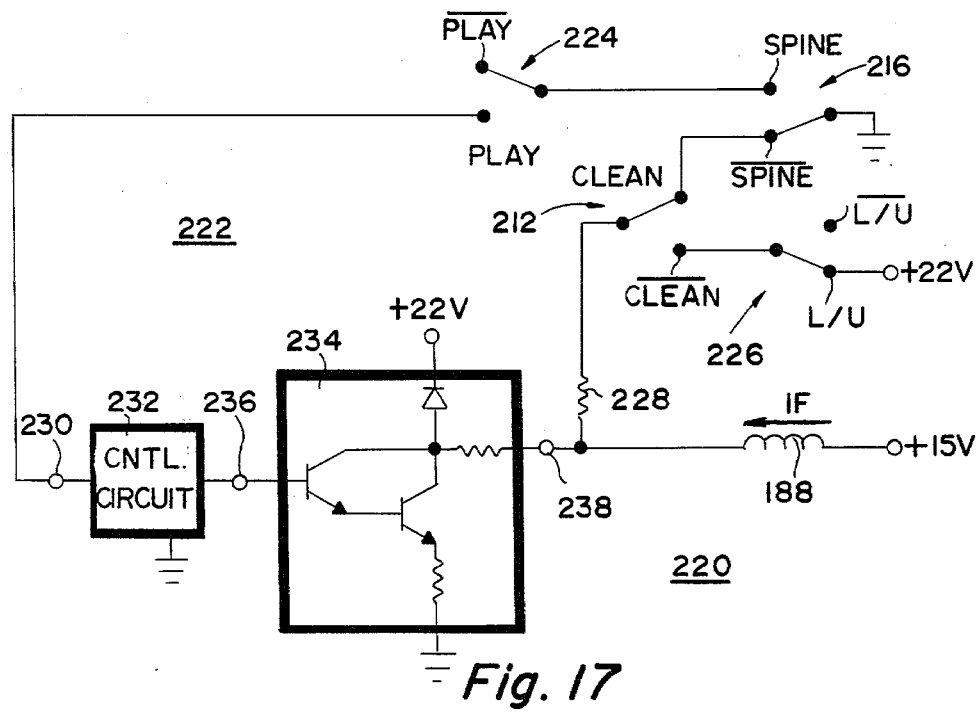
Figure 18:
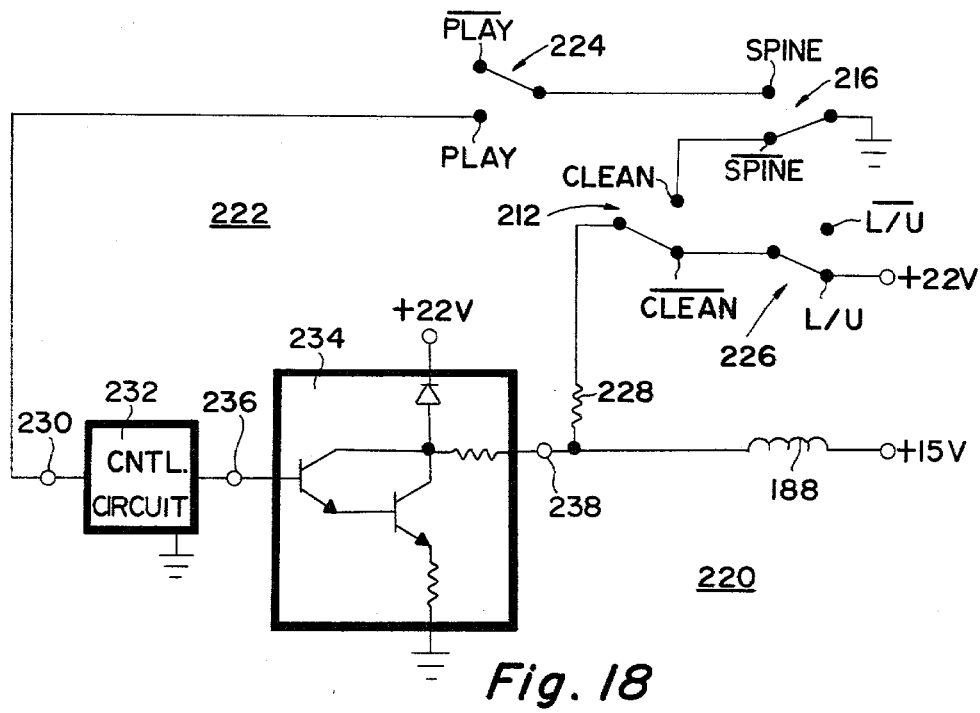

As the caddy is extracted from the player, it momentarily actuates the stylus cleaner switch 212, at which time the reverse current in the lifter winding 188 is ceased, and the forward current begins from the +15 volt supply into the ground potential through the stylus cleaner switch 212 and the spine sense switch 216. FIG. 17 shows the switch positions. The forward current causes the pickup stylus 140 to momentarily set down on the cleaning pad 176. As the spring-loaded cleaner arm 202 swings out, the cleaning pad 176 wipes the stylus 140. Further exit motion of the caddy causes the stylus cleaner switch 212 to open, as indicated in FIG. 18, and the reverse current through the lifter winding 188 resumes. The reverse current in the lifter winding 188 continues until the function lever 22 is shifted to the OFF position.

What is claimed is:

1. In a player for recovering prerecorded information from a turntable-supported disc record by means of a record-engaging pickup stylus disposed at one end of a stylus arm during playback; said player including means for selectively lowering said stylus on said record for playback; said selectively lowering means having a stylus arm support, means for yieldably biasing said stylus arm support in a raised position to dispose said stylus away from said turntable, and a selectively-energized means for overcoming said bias to lower said stylus in response to a signal of first polarity; an apparatus comprising:

means for applying a reverse polarity signal to said selectively-energized means, when the lowering of said stylus is not desired, to generate a force on said stylus arm support in a direction away from said turntable in addition to the upward force exerted on said stylus arm support by said yieldable biasing means.

2. Apparatus as defined in claim 1 for use with said player; wherein said player further includes an element subject to disposition in a playback mode and a record load/unload mode; wherein said first polarity signal is applied to said selectively-energized means to effect said stylus/record engagement when said element is disposed in said playback mode; wherein said reverse polarity signal is applied to said selectively-energized means to generate said force away from said turntable when said element is disposed in said record load/unload mode to prevent said stylus from coming down.

3. Apparatus as defined in claim 2 for use with said player wherein the other end of said stylus arm is secured to a translatable carriage by means of a flexible coupler; the bottom wall of said carriage having an opening through which said stylus protrudes, when lowered, to effect said stylus/record engagement; said carriage being driven from a starting position toward the center of said record to follow the radial motion of said stylus when said player is in said playback mode; wherein said record is enclosed in a protective caddy; wherein a full caddy is inserted into said player in a direction opposite to the direction of motion of said carriage during playback to load a record into said player when said player is disposed in said record load-/unload mode; wherein an empty caddy is reinserted into said layer, while said player is in said record load-/unload mode, to retrieve said record; said empty caddy engaging said carriage to drive it back to said starting position as said caddy is inserted into said player; said selectively-energized means preventing said stylus from being set down during said record load/unload operations.

4. Apparatus as defined in claim 3 for use with said player; wherein said player further includes a cleaner arm; said caddy engaging said cleaner arm to drive it back as said caddy is inserted into said player; said cleaner arm subsequently following the exit motion of said caddy as said caddy is withdrawn from said player; said apparatus further including an additional means for momentarily applying a first polarity signal to said selectively-energized means, to the exclusion of said reverse polarity signal, to lower said stylus onto a cleaning pad disposed on said cleaner arm during forward motion of said cleaner arm; further motion of said cleaner arm causing said cleaning pad to wipe said stylus; said reverse polarity signal applying means resuming the application of said reverse polarity signal to said selectively-energized means upon the cessation of operation of said additional means.

5. In a player for recovering prerecorded information from a turntable-supported disc record by means of a record-engaging pickup stylus disposed at one end of a stylus arm during playback; said player including means for selectively lowering said stylus on said record for playback; said selectively lowering means having a stylus arm support, means for yieldably biasing said stylus arm support in a raised position to dispose said stylus away from said turntable, and a selectively-energized electromagnetic means for overcoming said bias to lower said stylus; said electromagnetic means comprising a winding having a pair of terminals; one of said terminals being connected to a given potential source; the other of said terminals being connected through a play switch to a ground potential sink; operation of said play switch causing said given potential source to drive a current through said winding in a first direction into said ground potential sink to effect said stylus lowering; apparatus comprising:

(A) a higher potential source;
(B) a record load/unload switch;
(C) means for connecting said higher potential source to said other terminal of said winding via said load-/unload switch; and
(D) means for alternatingly actuating said play switch and said load/unload switch; operation of said alternatingly actuating means to open said play switch and to close said load/unload switch serving to disconnect said ground potential sink from said other terminal of said winding to block said current from passing through said winding in said first direction, and serving to cause said higher potential source to drive a current to flow through said winding in a reverse direction into said given potential sorce to prevent any tendency of said stylus to come down.

* * * * *

UNITED STATES PATENT AND TRADEMARK OFFICE
CERTIFICATE OF CORRECTION

PATENT NO. : 4,358,841
DATED : November 9, 1982
INVENTOR(S) : Charles B. Carroll and Alfred L. Baker It is certified that error appears in the above—identified patent and that said Letters Patent is hereby corrected as shown below:

Col. 4, Line 30

"is shut of" should be - is shut off -.

Col. 5, line 52

"so tha the" should be - so that the -.

Col. 8, Line 31

"into said layer" should be-into said player -.

Signed and Sealed this

Eighth Day of February 1983

[SEAL]

Attest:

GERALD J. MOSSINGHOFF

Attesting Officer

Commissioner of Patents and Trademarks